Figure 1:
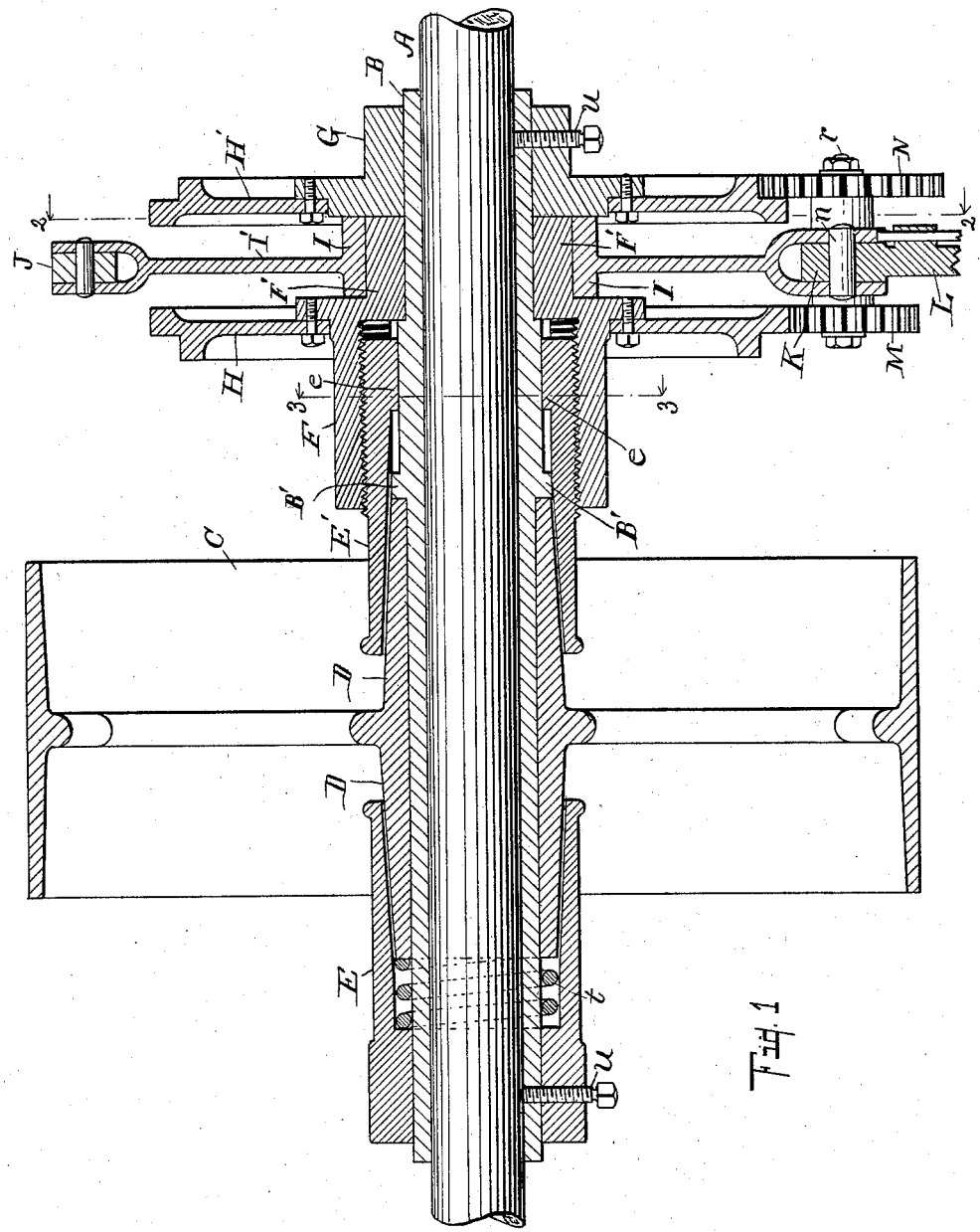

(No Model.) 2 Sheets—Sheet 1.

C. L. HIGGINS.
CLUTCH MECHANISM.

No. 590,007. Patented Sept. 14, 1897.

Witnesses.
J. N. Parkes
Lois Moulton.

Inventor.
Cyrus L. Higgins
By
Moulton & Flanders
Attorneys.

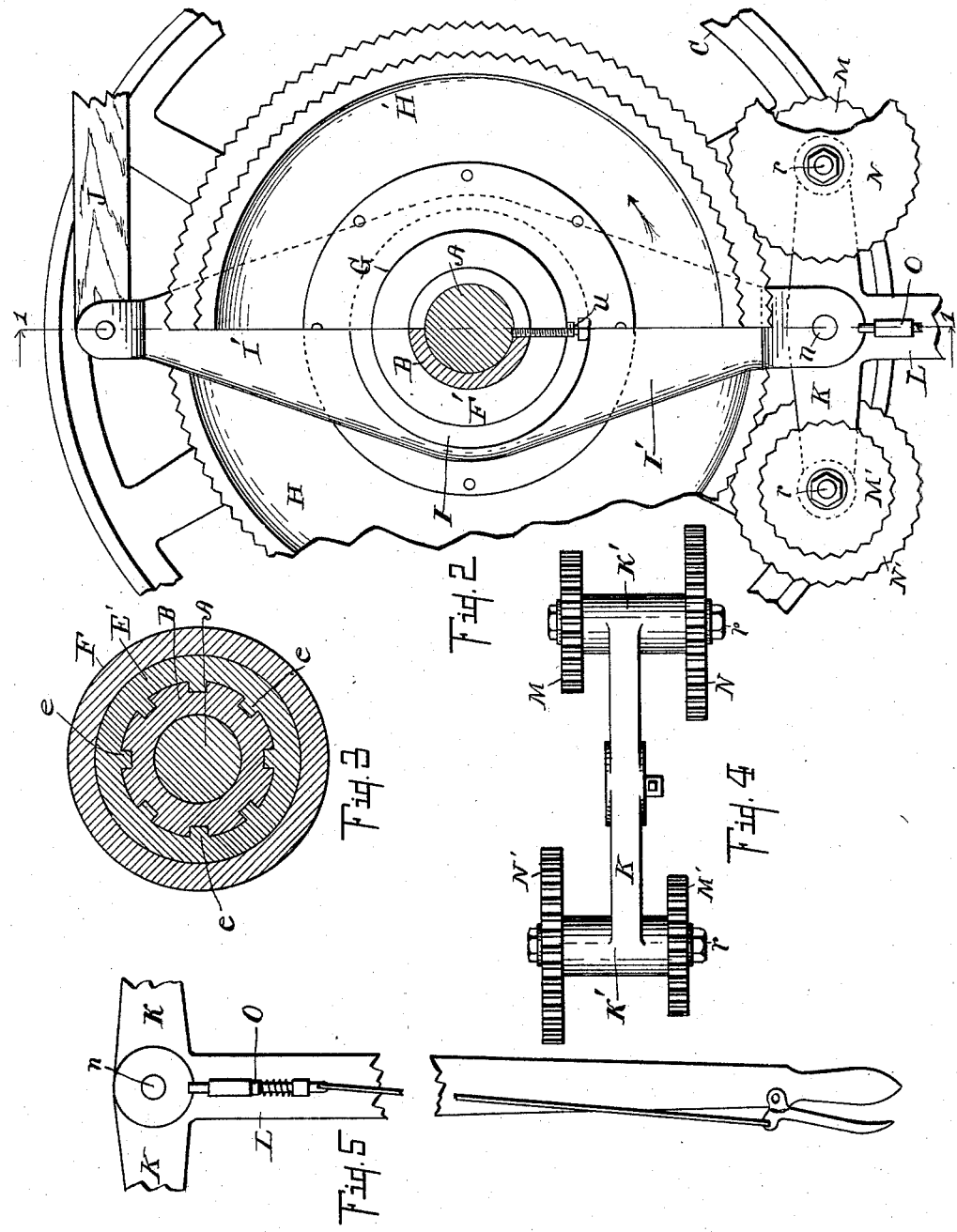

UNITED STATES PATENT OFFICE.

CYRUS L. HIGGINS, OF BELLEVUE, MICHIGAN.

CLUTCH MECHANISM.

SPECIFICATION forming part of Letters Patent No. 590,007, dated September 14, 1897.

Application filed October 12, 1896. Serial No. 608,538. (No model.)

*To all whom it may concern:*

Be it known that I, CYRUS L. HIGGINS, a citizen of the United States, residing at Bellevue, in the county of Eaton and State of Michigan, have invented certain new and useful Improvements in Clutch Mechanisms; and I do hereby declare the following to be a full, clear, and exact description of the invention, such as will enable others skilled in the art to which it appertains to make and use the same.

My invention relates to improvements in clutch mechanisms, and its object is to provide the same with certain new and useful features, hereinafter more fully described, and particularly pointed out in the claims, reference being had to the accompanying drawings, in which—

Figure 1 is a longitudinal vertical section of a device embodying my invention on the line 1 1 of Fig. 2. Fig. 2 is a partial section of the same on the line 2 2 of Fig. 1; Fig 3, a section on the line 3 3 of Fig. 1; Fig. 4, a detail of the speed-gearing, and Fig. 5 a detail of the shifting-lever.

Like letters refer to like parts in all of the figures.

A is the ordinary line-shaft, to which is secured by means of set-screws $u$ the sleeve B. Loosely journaled on said sleeve is the pulley C, having the elongated and tapered hub D, one end of which hub is in contact with the enlarged portion B' of the sleeve B when said pulley is used as a loose pulley, and the other end of said hub is engaged by the spring $t$, lying within a recess in the collar E. Said collar E is secured to the sleeve B and shaft A by means of the set-screw $u$ and has a funnel-shaped end which terminates in the recess before mentioned and is adapted to receive one end of the tapered hub D. On the enlarged portion B' of the sleeve B is another collar E', having a similar funnel-shaped end to receive the opposite end of the hub D, and is secured to and longitudinally movable on said enlarged portion by means of ribs $e$ on said collar and corresponding grooves in said sleeve. The said collar E' is provided with an external screw-thread, and a collar F, having an internal screw-thread, engages said threads of collar E' and has a reduced end F', which has a bearing on the sleeve B next the enlarged portion B'. Secured to said collar F is a wheel H, having two corrugated faces or peripheries, one of less diameter than the other, and secured to said sleeve B by means of a set-screw $u$ and in close proximity to the end F' of the collar F is a wheel H', having similar faces. Loosely journaled on said reduced portion F' of the collar F is a sleeve I, having an upwardly and a downwardly extending arm I', said upper arm being provided with a brace or stay J to prevent said arms from turning out of the perpendicular, and to said lower arm is pivoted at $n$ a T-lever composed of the long downwardly-extending hand-lever L and the laterally-extending arms K K, which are provided at their outer ends with elongated transverse journal-bearings K' to receive the shafts $r$, on the ends of which are secured the corrugated pinions M N M' N'. Said pinions are of two sizes, each pair being composed of a small and a large pinion adapted to engage one small and one large periphery of each of the wheels H and H'. Said pairs of pinions are not in line with each other and like pinions of each pair are at opposite sides of the lever. Therefore when the small pinion of one pair engages the large periphery of one of said wheels the large pinion of the opposite pair is in line with the small periphery of the same wheel.

Lever L is provided with a latch O, which engages a notch in the lower end of the arm I'.

When the pulley C is in the position shown in Fig. 1, it is perfectly free to turn or stand still, independent of the motion of the other parts, but when it is desirable to transmit motion from the shaft to said pulley a connection is made between the two in the following manner: Suppose that the shaft and wheel H' are revolving in the direction indicated by the arrow in Fig. 2. If the latch O be released and the lever L moved from the perpendicular until the pinions M N are brought into contact with the wheels H H', motion will be transmitted from the small periphery of the wheel H' to the large pinion N, thence through the small pinion M to the large periphery of the wheel H, thus reducing the speed of said wheel H. The collar E' is rotated by the shaft by means of the ribs $e$, and as said collar is connected with the collar F by means of the screw-thread said wheel H revolves at the same speed as the shaft and wheel H', but by connecting said wheels H and H' together, as described, by means of the pinions N M, the speed of the wheel H is reduced. There being a positive connection between the shaft or sleeve B and the collar E' when the speed of the wheel H is reduced the speed of said collar is not reduced, and therefore said collar, being longitudinally movable, will be turned out of the collar F, its funnel-shaped end coming in contact with one end of the tapered hub of the pulley C and forcing said pulley longitudinally against the action of the spring $t$ until the opposite end of said hub comes in frictional contact with the funnel-shaped collar E, which collar is driven by the shaft. The two tapered ends of the hub D are thus forced firmly into the funnel-shaped collars E and E' and the frictional contact maintained by the screw until such a time as the operator wishes to release the pulley, when the opposite pair of pinions M' N' are brought into contact with the wheels H H', the small gear M' into contact with the large periphery of the wheel H', and the large gear N' into contact with the small periphery of the wheel H, thus increasing the motion of the wheel H and causing the collar E' to be turned into the collar F and away from the hub D, allowing the spring $e$ to force the pulley C longitudinally until the opposite end comes in contact with the enlarged portion B' of the sleeve B. When the collar E' has been turned in or out as far as the operator wishes, the said pinions are disconnected from the wheels H H' by placing the handle L in a vertical position, where it will be held by the latch O. By using the long tapered hub I secure a substantial bearing for the pulley, and by using the funnel-shaped friction-collars in conjunction with said hub I provide a large surface for frictional contact and use it in the most advantageous manner, thus securing said pulley from slipping. On light work or small pulleys it is necessary to have but one friction-collar and the other may be dispensed with. By this arrangement there is a gradual and positive action of the friction which will not start the pulley too suddenly or allow the contact to slacken until such time as the operator wishes.

Having thus fully described my invention, what I claim, and desire to secure by Letters Patent, is—

1. The combination with the driving-shaft, and the loosely-journaled longitudinally-movable pulley having a tapered surface, of a fixed collar on one side of said pulley, having a tapered surface, a spring for forcing said pulley away from said collar, a device constructed and arranged to engage the other side of said pulley and movable longitudinally to force the same into close frictional engagement with said collar, said device rotating with the shaft and at the same speed as the same, and mechanism operative at a speed different from that of the shaft to impart said longitudinal movement to said device, as specified.

2. The combination with the driving-shaft, the loosely-journaled pulley longitudinally movable on said shaft, said pulley having a tapered surface, a fixed collar at one side of said pulley, having a tapered surface to engage that of the pulley and a recess in its end, and a spring in said recess tending to press said pulley away from said collar, of a device at the other side of said pulley, rotating with the shaft at the same speed thereas and movable longitudinally thereof, mechanism acting on said device to force it longitudinally and thereby engage said pulley with the collar or disengage said device from the pulley, said mechanism being rotated independently of the shaft, and means for rotating said mechanism at various speeds different from that of the shaft to cause said device to move in one or the other direction.

3. In combination with a shaft and a pulley having a tapered hub, loosely journaled thereon; a collar having a funnel-shaped end adapted to engage said hub, and externally screw-threaded; a spline connecting said collar and shaft; a wheel journaled on said shaft and having an internally-screw-threaded opening in its hub to engage said collar, and means for retarding and increasing the speed of said wheel, substantially as described.

4. The combination with the driving-shaft, and the loosely-journaled pulley of an externally-threaded collar splined on said shaft and constructed to engage said pulley and cause the same to rotate with said shaft, of means for moving said collar longitudinally into and out of engagement with said pulley, comprising a rotative collar on said shaft, having an internally-threaded engagement with said first-mentioned collar, a wheel secured to the internally-threaded collar, a wheel fixed on the shaft, each of said wheels being constructed to form two gears of different diameters, and a shiftable train of gears constructed and arranged to engage said gears of the wheels and coöperating therewith to change the speed of said rotative collar, substantially as described and for the purposes specified.

5. The combination with the driving-shaft and the loosely-journaled pulley, of a longitudinally-movable externally-threaded collar constructed to engage said pulley and cause the same to rotate with the shaft, said collar being rotated by said shaft and always at the same speed as the same, an internally-threaded collar engaging the longitudinally-movable collar, a wheel on said internally-threaded collar, a second wheel, fixed on the shaft, and connections between said wheels, constructed to cause the first-mentioned one to rotate at a speed different from that of the second one, substantially as described and for the purposes specified.

6. The combination with the driving-shaft, the loosely-journaled pulley having a tapered surface, and the longitudinally - movable threaded collar having a tapered surface designed to engage that of the pulley, said collar rotating with, and at the same speed as the shaft, of a wheel having a threaded hub engaging said collar, a second wheel (H') adjacent to said first-mentioned wheel, and mechanism, embodying a shiftable train of gears, engaging said wheels and constructed to change the speed of the first-mentioned one, for the purpose specified.

7. The combination with the shaft, and the loosely-journaled pulley having a tapered surface, of collars at opposite sides of the pulley, rotatable with the shaft and having tapered surfaces designed to engage that of the pulley, a spring in one collar engaging one side of the pulley, and means for moving the other collar longitudinally, to force the pulley longitudinally so that its tapered surface will be brought into wedging engagement with the tapered surfaces of both collars at the same time, as specified.

8. The combination with the shaft, and the loosely-journaled pulley thereon, having oppositely-tapered surfaces, of rotatable collars at opposite sides of said pulley, one of said collars being fixed and the other movable longitudinally of said shaft and each having a tapered surface designed to engage that at the adjacent side of the pulley, a spring in said fixed collar, pressing the pulley longitudinally in one direction, and means for moving the other collar longitudinally on the shaft to and from the pulley, embodying a wheel, the hub of which has a threaded engagement with said collar, and means for rotating said wheel at a speed different from that of said collar, substantially as specified.

9. The combination with the shaft, a loosely-journaled pulley having a tapered hub, and a grooved sleeve secured to said shaft and having a shoulder, of a longitudinally-movable threaded collar, having a tapered bore encircling said hub and provided with a key engaging said groove in the sleeve, a loose wheel mounted on said sleeve adjacent to said shoulder and having a threaded hub engaging said collar, a second wheel secured to said shaft, and a shiftable train of gears engaging both of said wheels and coöperating therewith to rotate said first-mentioned wheel at speeds different from that of the shaft.

10. The combination with the shaft, and a grooved sleeve secured thereto, having a shoulder, of a loose pulley on said sleeve, having a tapered hub, a longitudinally-movable threaded collar, having a tapered bore encircling said hub and provided with a key engaging said groove, a loose wheel, mounted on said sleeve adjacent to said shoulder and constructed with a hub having a threaded engagement with said collar, a second wheel (H') adjacent to said first-mentioned wheel, and mechanism, embodying a shiftable train of gears, engaging said wheels to change the speed of the first-mentioned one.

11. The combination with the shaft, of a loosely-journaled longitudinally-movable pulley rotatable therewith, said pulley having an elongated hub the ends of which are tapered in opposite directions, a fixed collar at one side of said pulley, having a tapered bore to receive the adjacent end of said hub, a spring in said bore, pressing the pulley outward from the same, a rotatable collar at the opposite side of said pulley, having a tapered bore receiving the contiguous end of said hub, and means for forcing the latter collar longitudinally, in one direction to lock the hub at once within both of said collars and in the other direction to cause the hub to become released from said collars.

12. The combination with the shaft, loose pulley, and longitudinally-movable device, rotatable with the shaft, for causing the pulley to rotate with the shaft, of means for moving said device longitudinally, comprising a loose wheel, having a threaded engagement with said device, and provided with gears of different diameters, a wheel rotatable with the shaft and formed to provide gears of different diameters, and two sets of shiftable gears, each set comprising two gears of different diameters, the larger of which gears engages the smaller gear of one wheel and the smaller of which gears engages the larger gear of the other wheel, as specified.

13. In combination, a shaft, a pulley loosely journaled on said shaft and having a tapered hub; an externally-threaded collar having a funnel-shaped end adapted to engage said hub splined on said shaft; a wheel having an internally-threaded hub and adapted to engage said externally-threaded collar journaled on said shaft; a wheel secured to said shaft; and gears rigidly connected to each other engaging said wheels, whereby the speed of the first-named wheel is changed, substantially as described.

14. In combination with a shaft and a longitudinally-movable pulley, having a tapered hub; a collar having a funnel-shaped end and a recess secured to said shaft; a spring within said recess; a collar splined on said shaft and externally screw-threaded; a recessed collar having an internal screw-thread, on said shaft; a wheel having two peripheries, one of less diameter than the other secured to said last-named collar; a wheel having two peripheries of different diameters secured to said shaft; a shaft supported beneath said wheels; and pinions, one of lesser diameter than the other, secured to the ends of said shaft and adapted to engage the peripheries of said wheels, substantially as described.

15. In combination with a shaft and a pulley having a tapered hub journaled on said shaft; a collar having a funnel-shaped end, and externally screw-threaded; a grooved sleeve on said shaft and ribs on said collar to engage said grooves; a collar having an internally-threaded recess, on said shaft; a wheel having two peripheries of different diameters secured to said recessed collar; a wheel having peripheries of different diameters secured to said shaft; a downwardly-extending arm journaled on one end of said recessed collar; a T-lever pivoted on said arm and pinions journaled on the arms of said T-lever and adapted to engage the peripheries of said wheels, substantially as described.

16. In combination, a shaft; a sleeve on said shaft having an enlarged portion; a pulley journaled on said sleeve and having a tapered hub; a collar having a funnel-shaped opening in its end, secured to said sleeve; a spring in said opening; an externally-screw-threaded collar having a funnel-shaped end, on said enlarged portion of said sleeve; ribs on said collar engaging grooves in said portion; a collar journaled on said sleeve and having an internally-screw-threaded end, a wheel having two corrugated peripheries, one of less diameter than the other, secured to said last-named collar; a wheel having two corrugated peripheries one of less diameter than the other secured to said sleeve; a collar between said wheels having an upwardly and a downwardly extending arm; a brace secured to said upper arm; a T-lever pivoted to said lower arm; shafts journaled in the ends of the laterally-extending arms of said lever; pinions secured to the ends of said shafts; and a latch secured to said lever and adapted to engage a notch in said arm, substantially as described.

In testimony whereof I affix my signature in presence of two witnesses.

CYRUS L. HIGGINS.

Witnesses:
RICHARD S. BRIGGS,
CHRIS. H. YORK.